United States Patent [19]

Baca et al.

[11] 4,052,741
[45] Oct. 4, 1977

[54] TRACK SEEKING AND FOLLOWING

[75] Inventors: Joseph Philip Baca, Longmont; Peter Thomas Marino, Boulder, both of Colo.

[73] Assignee: International Business Machines Corporation, Armonk, N.Y.

[21] Appl. No.: 643,900

[22] Filed: Dec. 23, 1975

[51] Int. Cl.² .................... G11B 21/10; G11B 5/012
[52] U.S. Cl. .............................. 360/77; 340/173 LM
[58] Field of Search ................. 360/77, 78, 75, 86, 360/109, 105, 106, 135; 340/173 R, 173 LM; 235/61.11 D, 61.11 E

[56] References Cited

U.S. PATENT DOCUMENTS

| 3,185,972 | 5/1965 | Sippel | 360/109 |
| 3,812,533 | 5/1974 | Kimura | 360/77 |
| 3,838,457 | 9/1974 | Palmer | 360/78 |
| 3,919,697 | 11/1975 | Walker | 340/173 R |
| 3,994,016 | 11/1976 | Moghadam | 360/77 |

Primary Examiner—Robert M. Kilgore
Attorney, Agent, or Firm—Herbert F. Somermeyer

[57] ABSTRACT

A servo sector record track location pattern provides both seeking and following capability. The durations of servo signals within a servo sector uniquely identify track location lines within a band of such track location lines. A first-appearing servo signal pattern always provides full amplitude readback signals for normalizing track following operations. Subsequently appearing servo signal patterns yield an amplitude representative of energy content which is comparable with the signal amplitude and energy content of the first-appearing servo signal for yielding track position error signals. Apparatus for employing the novel servo pattern is also disclosed.

21 Claims, 7 Drawing Figures

TRACK SEEKING AND FOLLOWING

DOCUMENTS INCORPORATED BY REFERENCE

Sippel U.S. Pat. No. 3,185,972 is incorporated for showing the principles of sector servoing with which the present invention is most advantageously employed Palmer U.S. Pat. No. 3,838,457 is incorporated for its showing of a track following servo system usable with a rotating disk magnetic memory apparatus.

Commonly assigned, copending, patent application Zimmerman et al, filed even date herewith in the Federal Republic of Germany, as Ser. No. P25 58 359.9 and in the United States on Sept. 10, 1976, as Ser. No. 722,183, discloses an invention over which the present application is an improvement.

Dennison et al, Ser. No. 643,892, filed even date herewith, shows a second invention over which the present invention is an improvement.

BACKGROUND OF THE INVENTION

The present invention relates to magnetic storage apparatus and more particularly to track seeking and following operations usable for accessing a given record track in such apparatus.

Magnetic recording devices have been employed for many years for use in conjunction with data processing apparatus. It is a desire in employing such apparatus to reduce access time for making a greater efficient use of the associated data processing apparatus. Such desires are most often manifested by increased recording data densities, both by increasing lineal density along the record track length, as well as increasing the track density. In many of the devices, particularly of the DASD or rotating magnetic disk type, one or more transducers are mounted on a radially movable carriage such that any track can be accessed by the supported transducer. Such an arrangement requires servo-positioning functions to ensure that the transducer faithfully scans a record area defined as a record track. At relatively low track densities, relatively simple apparatus may be employed; however, as track densities increase, the problem becomes asymptomatically acute. It is to the latter type of storage apparatus that the present invention is most advantageously used.

The above-referenced Sippel patent discloses that interleaving servo-positioning patterns for track following with data signals provides certain advantages. However, to precisely and rapidly radially locate a given track presents severe servomechanism problems. To this end, the cited copending patent applications teach that by grouping a given number of tracks into so-called "bands", access time can be reduced; that is, an initial accessing motion locates the transducer within a band of tracks. Subsequent to such "coarse" positioning movement, the servomechanism then senses signal patterns recorded on the disk, or other member, for locating a track within the band of tracks and for ensuring that the transducer faithfully follows the defined record track area.

Another important factor in constructing such magnetic memory apparatus is the cost factor. Accordingly, it is highly desirable to make operation low cost by using simple circuits and, at the same time, provide a greater degree of reliability such that actual access time to a record in the magnetic recorder is minimized.

SUMMARY OF THE INVENTION

It is an object of the present invention to provide enhanced servopositioning patterns and apparatus for using such patterns which reliably and simply identify track location, as well as provide simplified track following mechanisms.

In accordance with one aspect of the invention, track position indicating patterns within a band of tracks have a unique set of servo signal durations such that any track within a band can be uniquely identified merely by measuring the signal durations of such servo signals.

In another aspect of the present invention, the first encountered servo signal within a pattern or sector of such signals always yields a full amplitude readback signal. Such full amplitude signal is employed to normalize the servomechanism such that subsequently read signals are compared with the full amplitude signal for indicating position error.

Various combinations of servo signal patterns are provided to achieve and enable the above-described methods. Diverse signal lengths and spacing between first and second groups of servo signal patterns within a given servo sector facilitate combined seeking and following for track positioning.

In a most preferred form of the invention, a first group of signals constitutes a leading portion of the servo sector which, in turn, has a leading portion with a single continuous bar code signal extending the radial extent of each band such that there are no phase differences in read signals during an off-track transducer position for facilitating full amplitude calibration of the servomechanism.

In another aspect of the invention, the duration differences between servo signals in a first group and servo signals in a second group for each servo sector denote a track location within a band of tracks.

In yet another aspect, peak detection is employed in the respective groups of servo signals for indicating energy content whereby track position errors are faithfully indicated.

The above-described combination of functions in a track positioning apparatus is intended to yield insensitivity to small signal dropouts, AGC, or servo signal normalizing based upon full amplitude AGC operation irrespective of track position error. All tracks within a band are handled identically during a track following mode irrespective of signal pattern differences between the tracks and require only that a portion of each of the servo signals be at idealized amplitude.

The term "track" connotes one or more parallel record areas which are addressed as a unit.

The foregoing and other objects, features, and advantages of the invention will become apparent from the following more particular description of a preferred embodiment thereof, as illustrated in the accompanying drawing.

DETAILED DESCRIPTION

Figure 1:
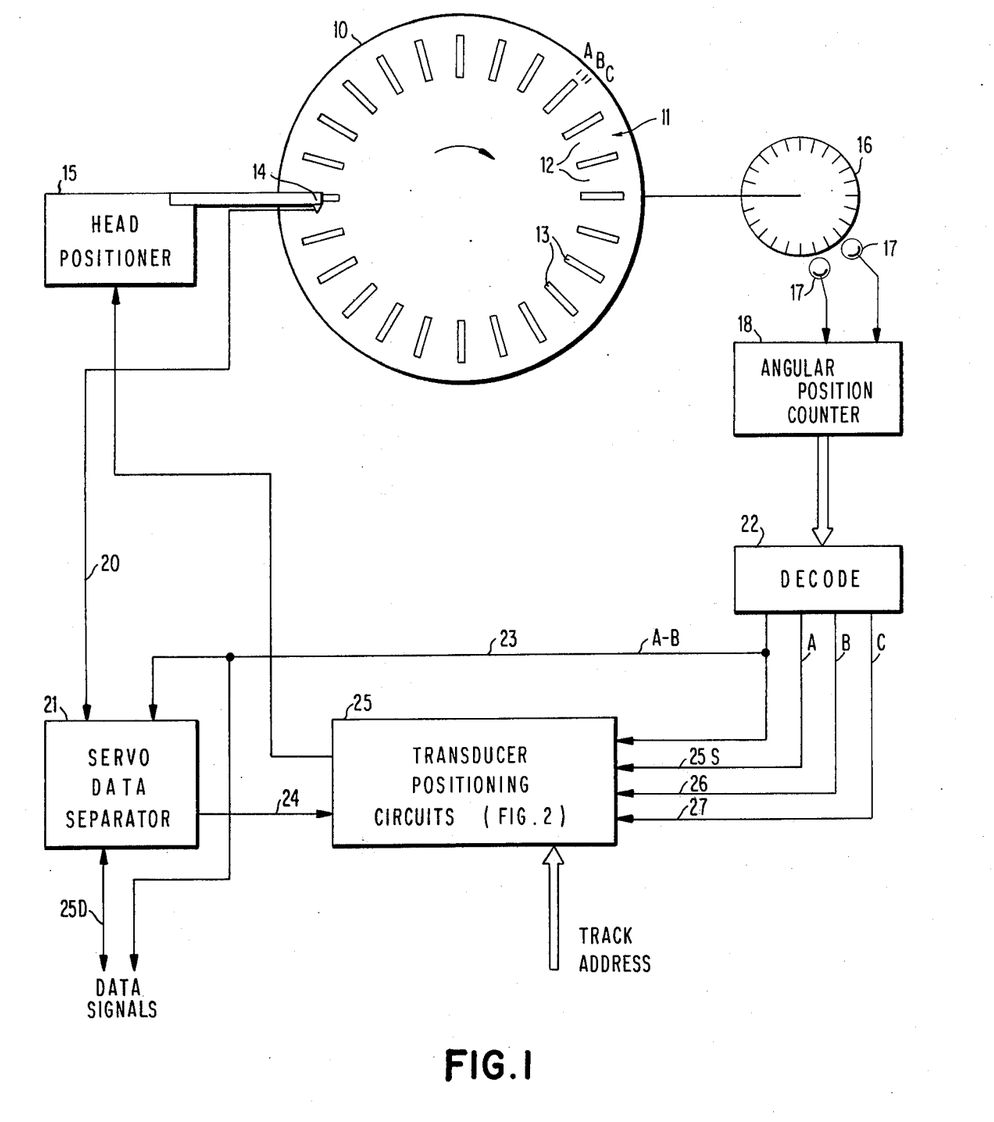
FIG. 1 is a simplified block diagram of apparatus employing the present invention.

Referring now to the drawing, like numerals indicate like parts and structural features. A rotatable record storage disk 10 has a recording area 11 consisting of interleaved data areas 12 and servo sectors 13. A transducer 14 is suitably mounted on a carriage (not shown) radially movable by head positioner 15. The transducer is capable of accessing any record track in recording area 11. Discrimination between servo areas 13 and data areas 12 can be achieved by angular position measurement via a tachometer 16 or a set of tachometer marks (not shown) disposed at the outer periphery of record disk 10. In the FIG. 1 illustrated apparatus, tachometer disk 16 is separate from disk 10, although it may be disposed on the reverse side thereof. Photoelectric sensors 17 supply tachometer signals including a fiducial signal to angular position counter 18. The fiducial signal resets the counter to a reference state for indicating that a reference position of disk 10 is currently being scanned by transducer 14. Since each of the servo sectors are equally circumferentially spaced along recording area 11, the angular position of each servo sector is known; for example, there may be 36 sets of servo sectors and data areas. Hence, there would be a 10° angular displacement between leading edges of adjacent ones of servo sectors 13. A servo sector itself may have an angular extent of 0.5°. Accordingly, as shown in FIG. 1, the angular displacement between point A, the leading edge of a servo sector, and point B, the trailing edge of a servo sector, is 0.5°. Point C represents an erased portion following the servo sector for enabling electronic switching and ensuring data does not override a servo signal. Such a displacement between B and C may be 0.02°. The data area then is 9.46° (there is an erased portion on each side of each area 13). The above figures are indicated for purposes of illustration only, and each record apparatus most optimal operating attributes should be independently ascertained.

Signals sensed by transducer 14 are supplied over line 20 to servo-data separator 21. Separator 21 is actuated by the angular position indications of counter 18 as decoded by decoder 22. Decoder 22 supplies an activating signal over line 23 each time the angular position counter indicates a 10° increment has been reached with the signal continuing for 0.5°. During this period of time, separator 21 supplies a servo signal over line 24 to transducer positioning circuits 25 shown in greater detail in FIG. 2. At all other times, the signals received by separator 21 from line 20 are supplied over line 25D as data signals. The line 23 signal also is sent along with the line 25D signals to apparatus (not shown) for identifying the operational state of the memory apparatus, i.e., whether it is reading data signals or servo signals. In the recording mode, the line 23 signals gate record signals to the record via servo-data separator 21 and transducer 14. For complete angular position control of the servo system, decode 22 also supplies A, B, and C pulses, respectively, over lines 25, 26, and 27 for precisely identifying the servo sectors.

Figure 2:
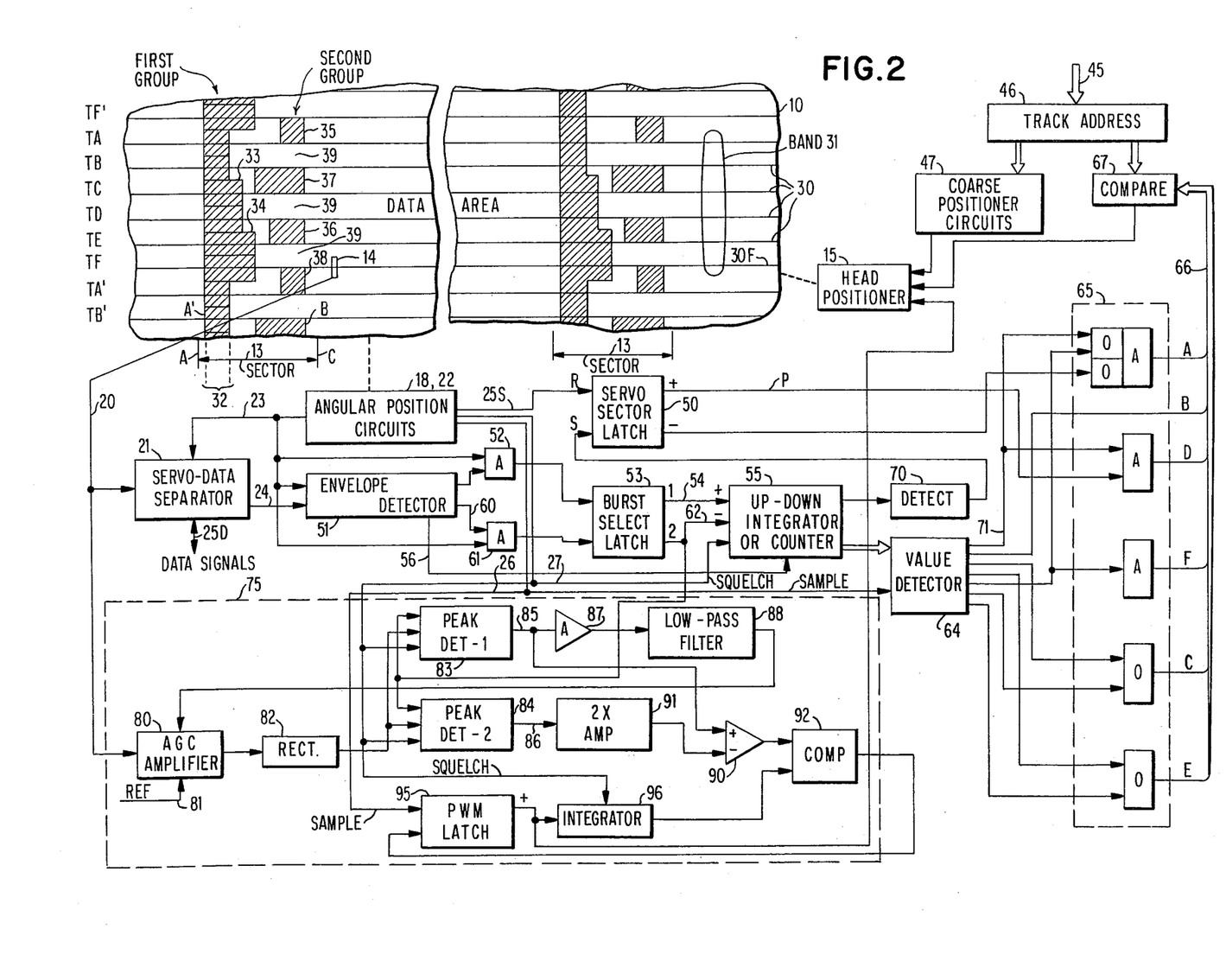
FIG. 2 is a block signal flow diagram of positioning circuits usable with the FIG. 1 illustrated apparatus.
Figure 3A:
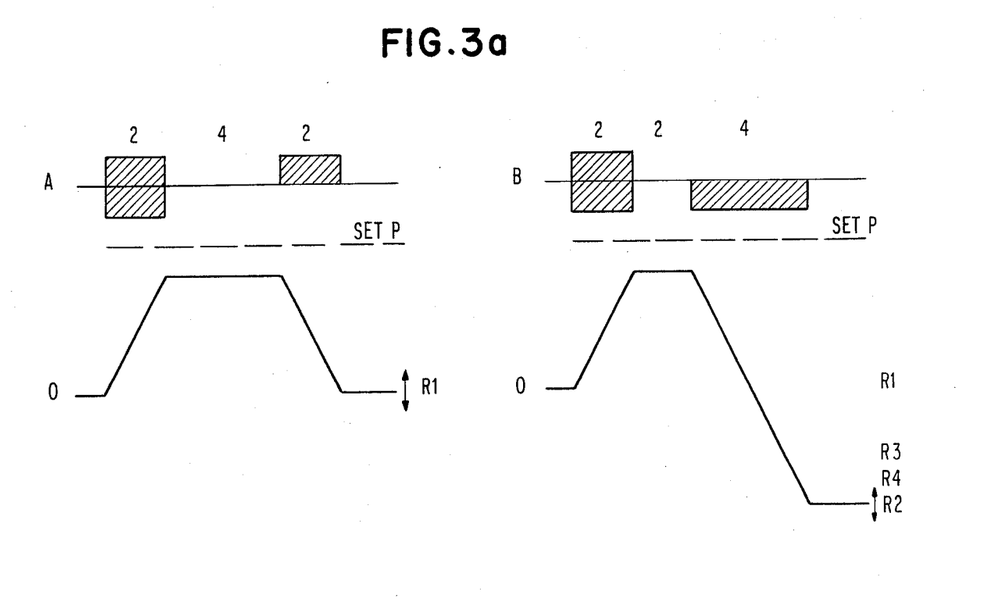
FIG. 3 (3a—3e) is a set of idealized signal waveforms and related servo patterns used to describe the operation of the illustrated apparatus.
Figure 3B:
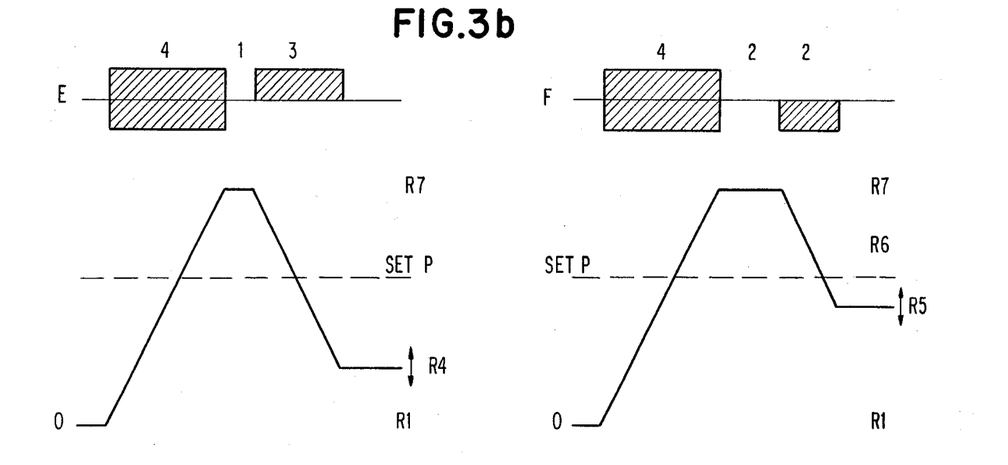
Figure 3C:
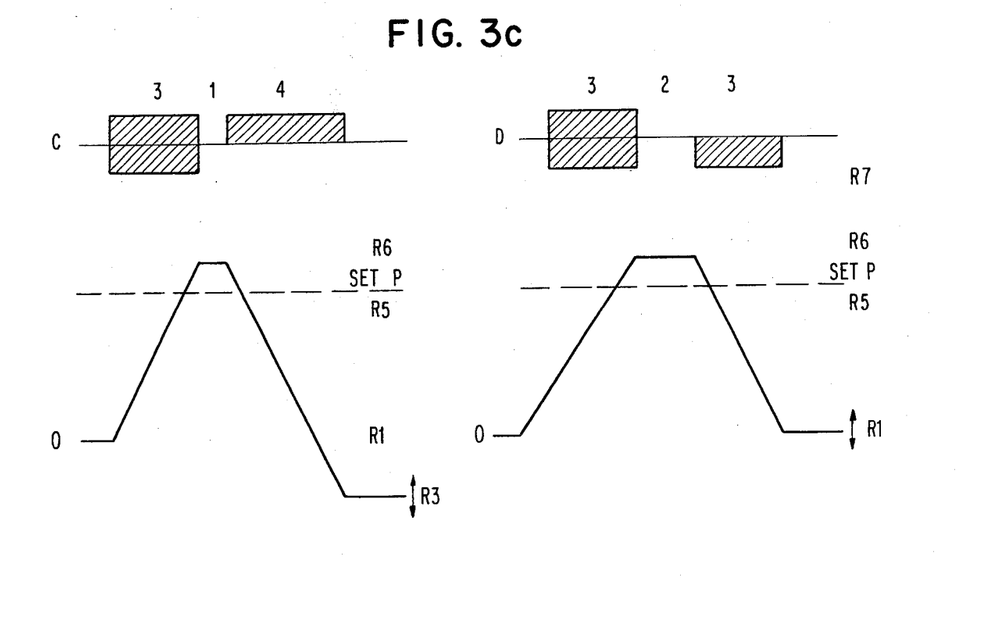
Figure 3D:
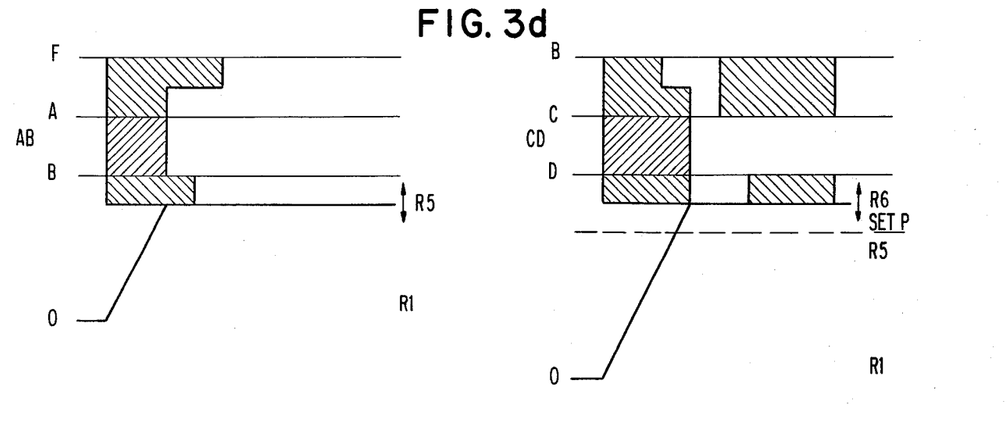
Figure 3E:
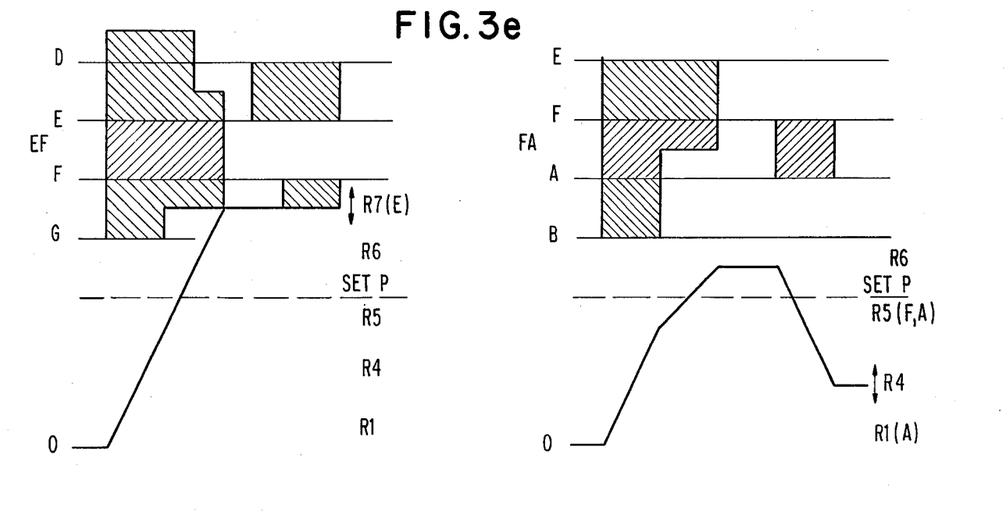

Referring now more particularly to FIG. 2, the servo sector pattern of the present invention is shown in diagrammatic detail. Each of the servo sectors 13 preferably includes an erased portion, as between A and A', to ensure that data signals are never recorded in the servo sector area; similarly, a trailing erased portion occurs between B and C. The leading edge of the servo sector signals is defined by a first group of servo signals, each of which is logically centered on track location lines 30 which, in the preferred form of the operation, are track center lines; i.e., the record track extends symmetrically about the track location lines 30, respectively. Transducer 14 is shown as scanning track TF by being centered over track location line 30F.

Returning now to the servo signal patterns, it is preferred that the signal extent be radially continuous across area 11. If area 11 has radial zones, then the group one signals are radially continuous across each of the zones. Each band 31 of tracks includes six tracks respectively denoted TA through TF, track TA being the radially inwardmost track. In positioning a head 14 to any given track, a band of tracks is logically defined around the track to be addressed, i.e., the target track. For track TF being a target track, tracks TD through TC' are a band of six tracks; for track TE, the six-track band is TC through TB; etc.

The first group of servo sector signals includes a first leading portion 32 wherein the signals are preferably printed on the record member to ensure there are no phase differences in the servo sector signals associated with adjacent ones of the tracks. That is, irrespective of transducer 14 position with respect to any track location lines 30, the same signal is always supplied over line 20. The advantage of such an arrangement will be described later with respect to automatic gain control operation of the preferred apparatus of the present invention. In addition to the leading portion 32 of the servo signals which is identical for all tracks, certain of the tracks are further identified by an elongation of the associated servo sector signals such as tracks TC through TF. Tracks TC and TD each have an elongation of the first group servo sector signals extending to 33, while tracks TE and TF first group servo signals are extended to 34. Then, for band 31 tracks TA through TF, two of the tracks TA and TB consist of leading portion 32 only, two of the tracks have an elongated portion up to 33 (tracks TC and TD), while two more have the longest duration first group servo sector signals (TE and TF). Hence, the duration of the first group of servo sector signals indicates which pair of tracks within any band of tracks transducer 14 is scanning. The angular position identifies the first group of servo signals.

Identification of the track, as well as position errors, is achieved by combining the first group signals with a second group of signals within the same sector 13. The second group servo signals include signals disposed between adjacent ones of the track location lines 30. Each of the second group servo sector signals also have a unique duration. Second group signal 35 extends between the track location lines of tracks TF' and TA; signal 36 has the next longest duration extending between tracks TD and TE location lines, while signal 37 extends between track location lines for tracks TB and TC. Therefore, second group signals are interposed between track location lines in alternating relationship to the erased portions 39.

Examination of the first and second group signals for each of the tracks within a band shows the unique identification of the signal durations, as well as showing the enablement of position error signals. In track TA, the shortest duration of the first group signals indicates a track TA or TB. A short duration signal of half amplitude from second group signal 35 uniquely identifies track TA, the longest duration second group half amplitude signal 37 uniquely identifies TB. The above statements apply for up to a 50% track error. Since both tracks TA and TB yield a full amplitude signal irrespective of track position error, transducer 14 scans leading portion 32 setting AGC circuits for that particular scan of sector 13 enabling precise normalization of the half amplitude signals from either signals 35 or 37 of the second group. In a similar manner, tracks TC through TF can be analyzed by inspection of the FIG. 2 showing which yields unique duration combinations for all track location lines within a band of track location lines. It is to be understood that each track location line may identify a plurality of record tracks, while in the preferred mode a single track is desired to be used. Hence, each track location line may identify a sub-band of signals. This is particularly useful at extremely high densities wherein a head assembly including a plurality of gaps 14 is mounted on a single support structure. Each of the servo sectors 13 are constructed identically.

The extended portions 33 and 34 for identifying tracks TC through TF may be recorded at the same time the leading portion 32 is recorded. In this manner, there is no phase difference in any portion of the signals between any adjacent ones of the record tracks. The recording may be by magnetic transfer.

To move transducer 14 to an addressed track, such as TF of band 31, an associated control apparatus (not shown) supplies a track address signal over cable 45 to track address register 46. The higher numbered digits of the track address indicate which band of a plurality of radial bands of recording area 11 is to be accessed. For track TF, it is band TD-TC'. Such more significant digits from the register are supplied to coarse positioning circuits 47 constructed in accordance with present-day track positioning apparatus. Such apparatus may have a linear tachometer associated with a comb head support for moving the comb head support assembly (not shown) to a predetermined radial position. The techniques and apparatus shown in Goddard et al U.S. Pat. No. 3,503,060 may be employed in this regard. The ensuing description assumes that transducer 14 has been successfully positioned within a band of track location lines 30 which, on the record member, are imaginary lines as defined above.

As described for FIG. 1, angular position circuits 18 and 22 define servo and data angular sections of the record disk 10. Upon detection of position A, circuits 18 and 22 supply an activating pulse over line 25S setting servo sector latch 50 which memorizes that a servo sector is being scanned. This pulse, plus the line 23 servo sector indicating signal, enables envelope detector 51 to detect the servo signal envelope received from separator 21 over line 24. Upon detecting that a substantial amplitude is being received, envelope detector 51 supplies a gate enabling signal to AND circuit 52. The line 23 signal then passes through AND 52 to set burst select latch 53 to the active condition. Being set, latch 53 signifies that a first group servo sector signal is being scanned. It will be remembered that the duration of such servo signals must be precisely measured. To this end, an activating signal supplied over line 54 activates time measuring up/down integrator 55 (which may be a digital counter driven by a constant frequency oscillator) in a count-up or count in the first direction mode. Envelope detector 51 supplies a signal over line 56 enabling counter 55 as long as an envelope is being detected. In order to avoid problems with defects causing a false end of signal indication, servo integration techniques are employed in envelope detector 51, i.e., a low-pass digital filter. This obviates minor defects from affecting up/down integrator 55. At the terminus of first group servo signals, the line 56 signal is made inactive causing up/down integrator 55 to maintain the up count, i.e., maintain the indication of the duration of the first group signal sensed by transducer 14.

Upon detecting the onset of the second group servo sector signal, envelope detector 51 again supplies an activating signal over line 56. Simultaneously therewith, a pulse type signal supplied over line 60 enables AND circuit 61 to pass the signal on line 23 resetting burst select latch 53. Burst select latch 53 being reset supplies an activating signal over line 62 causing up/down integrator or counter 55 to count in the reverse direction. Accordingly, as long as envelope detector 51 is supplying a signal over line 56, up/down integrator or counter 55 counts down subtracting the length of the burst in the second group signals from the length of the signal in the first group signal.

At time B, which is determined by the angular position circuits 18 and 22, a signal on line 26 actuates difference value detector 64 to detect the signal content of up/down integrator or counter 55 for indicating the track within band 31 currently being scanned, i.e., the track center line 30 which is closest to the center of gap 14. Since, as previously described, the relative durations of the first group signals to the second group signals is unique for each track, the residual count in counter 55 yields a unique identification. Such unique identification is decoded by a plurality of circuits comprising a decoder 65 with a track indicating signal supplied over cable 66 to compare circuit 67. The other input to compare circuit 67 is from track address register 46 identifying which of the six track location lines 30 is to be addressed by the above-described operation. The compare is merely a difference circuit showing whether or not the correct track is accessed. For example, if transducer 14 was centered over track TE, a difference of +1 (indicating radial outward movement) would be supplied to head positioner 15 causing transducer 14 to be moved radially outwardly, etc.

Returning now to value detector 64, an analog embodiment includes an amplitude detector (not shown) for detecting seven threshold ranges R1-R7 for identifying the six tracks. As a result of the residual differential value in integrator 55, detector 64 aligns one of the thresholds for decoding as follows:

$$A = (R1 + R5) \cdot P \tag{1}$$

$$B = R2 \tag{2}$$

$$C = R3 + R6 \tag{3}$$

$$D = R1 \cdot P \tag{4}$$

$$E = R4 + R7 \tag{5}$$

$$F = R5 \cdot P \tag{6}$$

In the equations (1)-(6), A-F indicates track location lines, R1-R7 the seven thresholds of value detector 64, and P is a level between R5 and R6. The level values are shown in FIG. 3, while the equations are solved by decoder 65 and latch 50(P) set by threshold detector 70.

Solution of the equations (1) through (6) can be determined by inspection of the circuit connections of decoder 65. The outputs of decoder 65 travel over cable 66 to compare 67. Compare 67 compares the detected track address within a group with the desired track address from register 46. The results of that comparison are supplied to head positioner 15 for respectively accepting coarse positioning circuits 47 signals or rejecting same.

FIG. 3 illustrates the relationship of the up/down integrator 55 signals, the threshold levels for value detector 64, together with the servo signal patterns for tracks A through F, plus selected intertrack patterns. Inspection of FIG. 3 clearly shows the operation of detector 64, it being understood that the values R1-R7 are determined by known type of amplitude threshold detectors. It is to be understood that integrator 55 and detector 64 may be digitally constructed as an alternative to the presently preferred analog constructions.

Circuit 75 receives servo signals from data separator 21 over line 20. AGC amplifier amplifies the servo signals to a reference potential as determined by the reference input on line 81. Amplifier 80 is activated to the active condition by the signal on line 62 from burst select latch 53. That is, gain is automatically adjusted in a group one burst 32; gain then holds constant for the group two servo signal bursts. Rectifier 82 full-wave rectifies the output of amplifier 80 and supplies the rectified signal to a pair of peak detectors 83 and 84. Peak detectors 83 and 84 detect the peaks of the group one and group two servo signal bursts, respectively, and hold same until gated out by the signal received over line 27 which then causes both peak detectors to supply the detected peak amplitude values respectively over lines 85 and 86. The first detector signal on line 85 travels through amplifier 87, thence low-pass filter 88, back to AGC amplifier 80 for setting the AGC amplifier in preparation for receiving the servo signals from the second group. The value in peak detector 83 is maintained for later use by differential amplifier comparator 90. Peak detector 2 detects the peak of the second servo signals and gates out same to 2X amplifier 91 (the second servo signals are always one-half the amplitude of the first servo signals, the 2X amplifier normalizes the amplitude in the second group signals to that of the first group signals). 2X amplifier 91 supplies its output signal to differential subtractor amplifier 90. The differential result, i.e., the track offset or PES, is supplied to compare circuit 92. Upon a sample being required for servo positioning, the sample pulse from angular position circuits 18 and 22 set pulse-width modulator latch 95. PWM latch 95 supplies an activating signal to integrator 96 for metering time that latch 95 is being set. Integrator 96 supplies its integrated output to comparator 92 which compares its value with the output of differential amplifier 90. When the two values are equal, comparator 92 triggers resetting latch 95. The time that latch 95 was set to the active condition is an indication of the actual position error. Accordingly, line 91 carries the active output of latch 95 to head positioner 15 as a pulse-width modulated PES.

While the invention has been particularly shown and described with reference to a preferred embodiment thereof, it will be understood by those skilled in the art that various changes in form and detail may be made therein without departing from the spirit and scope of the invention.

What is claimed is:

1. The method of track seeking and following using a pattern of servo signals for grouping the tracks into bands with servo signal durations for each track within each band being in a unique combination, and a plurality of servo signals for each track disposed along a given sector length of each said track;

the improvement including the following steps in combination:

measuring durations of said servo signals for indicating track position within a band; and measuring energy of each said servo signals and comparing same for indicating position error with respect to said indicated track.

2. The method set forth in claim 1 further including, while measuring the duration of a first-appearing one of said servo signals, determining effective amplitude of such servo signal; and adjusting said energy measurement in accordance with said effective amplitude.

3. The method set forth in claim 2 including the steps of:

peak detecting said first-appearing servo signal for establishing said effective amplitude, peak detecting subsequent servo signals as an indication of energy in the respective signals, and comparing the peak detected amplitudes for determining position error signals.

4. The method set forth in claim 1 further including the steps of independently measuring the durations of said servo signals, comparing said measured durations, and generating a resultant difference signal for indicating track location.

5. The method set forth in claim 1 further including the steps of:

while measuring the duration of a first one of said servo signals, also measuring an amplitude of such first-appearing servo signals; and indicating track-centered amplitude as said measured amplitude;

measuring energy of subsequent ones of said servo signals for normalizing said subsequent measurement to said first full amplitude measurement, generating a difference signal between the subsequent measurements and said first-appearing measurement, and supplying said difference signal as a position error signal.

6. The method set forth in claim 1 wherein said plurality of servo signals is a burst of two servo signals spaced along the length of each track, each servo signal along the respective tracks having a unique length, said spacing between ones of said servo signals adjacent a given one of said tracks being unique along a given track location line;

the improvement further including the step of:

effectively measuring said space and taking the three measurements of the first-appearing one of said servo signals and the last-appearing one of said servo signals together with said space measurement for indicating track identification.

7. The method set forth in claim 1 wherein when measuring energy of said received servo signals:

peak amplitude detecting amplitude of each said servo signals in each said track sector length;

adjusting gain of signals applied prior to peak amplitude detection in accordance with one of said detected peak amplitudes;

comparing said detected peak amplitudes to generate an error signal; and converting said error signal to a PWM signal.

8. A record member having a magnetically coated surface for receiving signals in a plurality of parallel tracks having equally spaced and parallel track location lines defined by a plurality of servo position signals spaced along the track lengths in servo sectors, each sector having a leading portion;

the improvement including in combination:

each of said sectors having a plurality of recorded servo signal groups, each said group including a plurality of recorded servo signals disposed transversely to said track location lines;

a first of said recorded signal groups being disposed in said leading portion having a recorded servo signal disposed and centered on each of said track location lines for yielding a full amplitude servo signal when sensed by a transducer for each track location line; and a second of said recorded signal groups being disposed so as to be sensed after said recorded servo signals in said first group and having diverse transverse positional relationships to said track location lines, each said diverse relationship indicating position errors when measured for signal energy contained in each such signal in said second signal group with respect to said first group recorded servo signal.

9. The record member set forth in claim 8 wherein each said servo signal in said first group within each said band being a continuous signal the entire radial extent of said band, and including trailing portions extending less than the full radial extent of said band wherein said radial continuity extends for at least two of said track centering lines.

10. The record member set forth in claim 9 wherein signals in said first group have diverse lengths with at least a pair of signals for identifying adjacent ones of said track location lines being continuous and all diverse lengths including a continuous signal extending over two predetermined pairs of said adjacent track location lines.

11. The record member set forth in claim 10 wherein said servo signals in said first group all have a constant single frequency.

12. The record member set forth in claim 8 wherein said servo signals of said second group are each interposed between predetermined ones of said track location lines and being spaced apart transverse to the length of said track location lines a distance equal to at least the space between two adjacent ones of said track location lines.

13. The record member set forth in claim 12 further including in combination:

said signals in said second group being of diverse lengths having a constant width equal to the spacing between adjacent ones of said track location lines and being disposed in alternate ones of interstices between said track location lines such that extending transverse to the track location lines there are alternate spaces and servo signals.

14. The record member set forth in claim 13 wherein each of said servo signals in said second group having a unique length within each band; and servo signals in said first group having diverse lengths with each length encompassing two adjacent ones of said track location lines.

15. The record member set forth in claim 14 wherein said servo signals in said first group have a common phase within each band such that cycles of recording extend uniformly and transversely to said track location lines, and all of said servo signals in said first group having a common leading edge whereby said servo signals in said first group serve as an AGC burst for all signals in said even sector irrespective of track position error.

16. A record member having a magnetically coated surface for receiving signals in a plurality of parallel record tracks having track location lines defined by a plurality of servo position signal sectors spaced along the track length;

the improvement including in combination:

each sector having a plurality of servo signal groups extending transversely to said track location lines and being spaced along the tracks within each said sector;

a first of said groups having a servo signal pattern centered on each respective one of said track location lines;

a second of said groups having a plurality of servo signal patterns extending between predetermined ones of said track location lines; and certain ones of said servo signal patterns having diverse durations for identifying a band of said track location lines.

17. The record member set forth in claim 16 wherein said servo signal patterns of said first group having a common leading edge and a portion with common phase attributes extending radially the entire radial extent of each of said bands; and predetermined ones of said first signal patterns having a trailing edge portion extending toward said second group servo signal patterns from said leading edge portion.

18. The record member set forth in claim 17 wherein said predetermined ones of said track location lines are adjacent ones of said track location lines such that said second group of signals includes servo signal patterns alternating with erase portions extending transversely to the track location line length.

19. The record member set forth in claim 18 wherein each of said servo signal patterns in said second group are disposed longitudinally adjacent a change in length of said servo signal patterns of said first group such that, for adjacent ones of said track location lines, a differing duration combination occurs for all servo signal patterns along each and every one of said track location lines.

20. The method of operating a positioning apparatus having two relatively movable members including the steps of:

seeking an addressed position by relatively moving said members;

once said members are approximately at said addressed position, keeping said positioned members thereat by a position following operation; and during said position following operation simultaneously and continuously seeking said addressed position even though said members are at said addressed positional whereby any position perturbations from said addressed position are automatically compensated for.

21. The method of locating and centering a sensing transducer with respect to a given record track disposed in a given group of record tracks of a plurality of such groups; each record track being identifiable by a pattern of servo signals of unique duration and transverse placement within each said group;

including the steps of:

locating said given group of record tracks;

measuring durations of servo signals being scanned in said given group and indicating the track being scanned in accordance with said measured durations;

determining transverse locations of said servo signals being scanned for indicating transverse location with respect to said track being scanned;

comparing said indications with a desired indication of said given track; and positioning said sensing transducer in accordance with said indications.

* * * * *